(12) United States Patent
Goodenough et al.

(10) Patent No.: US 8,254,517 B2
(45) Date of Patent: Aug. 28, 2012

(54) CT SCANNING AND CONTRABAND DETECTION

(75) Inventors: David J. Goodenough, Salamanca (ES); Michel Herranz, Salamanca (ES); Luis Roso Franco, Salamanca (ES)

(73) Assignee: Sentinel Scanning Corporation, Myersville, MD (US)

( * ) Notice: Subject to any disclaimer, the term of this patent is extended or adjusted under 35 U.S.C. 154(b) by 0 days.

(21) Appl. No.: 13/047,003

(22) Filed: Mar. 14, 2011

(65) Prior Publication Data

US 2011/0163239 A1 Jul. 7, 2011

Related U.S. Application Data

(62) Division of application No. 12/070,043, filed on Feb. 13, 2008, now Pat. No. 7,929,664.

(60) Provisional application No. 60/901,048, filed on Feb. 13, 2007, provisional application No. 60/901,065, filed on Feb. 13, 2007.

(51) Int. Cl.
*G01N 23/00* (2006.01)
*G01J 1/58* (2006.01)

(52) U.S. Cl. .................. 378/19; 250/483.1
(58) Field of Classification Search .......... 378/98.9, 378/19, 4; 250/366, 483.1, 368
See application file for complete search history.

(56) References Cited

U.S. PATENT DOCUMENTS

| | | | |
|---|---|---|---|
| 2,209,963 A | 8/1940 | Du Mond | |
| 2,539,196 A | 1/1951 | Marshall | |
| 2,586,304 A | 2/1952 | Coltman et al. | |
| 3,018,374 A | 1/1962 | Pritchett | |
| 3,636,353 A | 1/1972 | Untermyer | |
| 3,862,450 A | 1/1975 | Mossman | |
| RE28,544 E | 9/1975 | Stein et al. | |
| 3,924,132 A | 12/1975 | Koslow | |
| 4,031,545 A | 6/1977 | Stein et al. | |
| 4,149,081 A | 4/1979 | Seppi | |
| 4,158,142 A | 6/1979 | Haimson | |

(Continued)

FOREIGN PATENT DOCUMENTS

EP 1 319 963 12/2001

(Continued)

OTHER PUBLICATIONS

International Search Report & the Written Opinion of the International Application No. PCT/US10/01643, International Filing Date Jun. 7, 2010, Dated Oct. 13, 2010.

(Continued)

*Primary Examiner* — Irakli Kiknadze
(74) *Attorney, Agent, or Firm* — Eric L. Sophir; SNR Denton US LLP

(57) ABSTRACT

CT scanning of transportation containers is performed by generating X-rays at various points at the opposite sides of the containers, detecting the X-rays passing through the containers, and analyzing the data received to determine the presence of contraband. The X-rays are generated by modulating a magnetic field through which a high-energy electron beam passes to deflect the beam successively to different targets positioned around the sides of the container, while the electron beam source remains stationary. The X-rays are detected by an array of cells using X-ray responsive storage phosphor material to emit light which is sent to analyzing and comparing equipment. The targets and detectors and the cargo container are moved relative to one another to scan a selected volume of the container.

14 Claims, 8 Drawing Sheets

U.S. PATENT DOCUMENTS

| | | |
|---|---|---|
| 4,196,352 A | 4/1980 | Beringer et al. |
| 4,229,654 A | 10/1980 | Arya et al. |
| 4,251,726 A | 2/1981 | Alvarez |
| 4,258,264 A | 3/1981 | Kotera et al. |
| 4,346,295 A | 8/1982 | Tanaka et al. |
| 4,352,021 A | 9/1982 | Boyd et al. |
| 4,357,535 A | 11/1982 | Haas |
| 4,430,568 A | 2/1984 | Yoshida et al. |
| 4,439,866 A | 3/1984 | Kato et al. |
| 4,485,481 A | 11/1984 | Takano |
| 4,521,900 A | 6/1985 | Rand |
| 4,531,226 A | 7/1985 | Peschmann |
| 4,571,493 A | 2/1986 | Horikawa |
| 4,573,179 A | 2/1986 | Rutt |
| 4,591,714 A | 5/1986 | Goto et al. |
| 4,599,740 A | 7/1986 | Cable |
| 4,631,741 A | 12/1986 | Rand et al. |
| 4,671,256 A | 6/1987 | Lemelson |
| 4,722,096 A | 1/1988 | Dietrich et al. |
| 4,736,396 A | 4/1988 | Boyd et al. |
| 4,767,927 A | 8/1988 | Ohyama et al. |
| 4,809,312 A | 2/1989 | Annis |
| 4,812,660 A | 3/1989 | Lindmayer |
| 4,818,876 A | 4/1989 | Agano et al. |
| 4,822,520 A | 4/1989 | Lindmayer |
| 4,825,454 A | 4/1989 | Annis et al. |
| 4,839,092 A | 6/1989 | Lindmayer |
| 4,842,960 A | 6/1989 | Lindmayer |
| 4,879,186 A | 11/1989 | Lindmayer |
| 4,918,315 A | 4/1990 | Gomberg et al. |
| 4,941,162 A | 7/1990 | Vartsky et al. |
| 4,952,814 A | 8/1990 | Huntzinger |
| 4,956,856 A | 9/1990 | Harding |
| 4,963,746 A | 10/1990 | Morgan et al. |
| 4,964,148 A | 10/1990 | Klostermann et al. |
| 4,987,584 A | 1/1991 | Doenges |
| 4,989,225 A | 1/1991 | Gupta et al. |
| 5,007,072 A | 4/1991 | Jenkins et al. |
| 5,014,293 A | 5/1991 | Boyd et al. |
| 5,023,895 A | 6/1991 | McCrosky et al. |
| 5,044,002 A | 8/1991 | Stein |
| 5,065,023 A | 11/1991 | Lindmayer |
| 5,065,418 A | 11/1991 | Bermbach et al. |
| 5,076,993 A | 12/1991 | Sawa et al. |
| 5,097,494 A | 3/1992 | Pantelleria et al. |
| 5,098,640 A | 3/1992 | Gozani et al. |
| 5,115,459 A | 5/1992 | Bertozzi |
| 5,124,554 A | 6/1992 | Fowler et al. |
| 5,124,658 A | 6/1992 | Adler |
| 5,138,642 A | 8/1992 | McCrosky |
| 5,153,439 A | 10/1992 | Gozani et al. |
| 5,182,764 A | 1/1993 | Peschmann et al. |
| 5,185,774 A | 2/1993 | Klostermann et al. |
| 5,197,088 A | 3/1993 | Vincent et al. |
| 5,200,626 A | 4/1993 | Schultz et al. |
| 5,278,418 A | 1/1994 | Broadhurst |
| 5,313,511 A | 5/1994 | Annis et al. |
| 5,367,552 A | 11/1994 | Peschmann |
| 5,410,156 A | 4/1995 | Miller |
| 5,420,905 A | 5/1995 | Bertozzi |
| 5,440,133 A | 8/1995 | Moyers et al. |
| 5,469,487 A | 11/1995 | Hu |
| 5,471,516 A | 11/1995 | Nunan |
| 5,490,193 A | 2/1996 | Kuroda et al. |
| 5,490,218 A | 2/1996 | Krug et al. |
| 5,491,734 A | 2/1996 | Boyd et al. |
| 5,493,596 A | 2/1996 | Annis |
| 5,495,106 A | 2/1996 | Mastyny |
| 5,513,236 A | 4/1996 | Hui |
| 5,524,133 A | 6/1996 | Neale et al. |
| 5,541,970 A | 7/1996 | Hu |
| 5,557,108 A | 9/1996 | Tumer |
| 5,559,847 A | 9/1996 | Hu et al. |
| 5,600,303 A | 2/1997 | Husseiny et al. |
| 5,600,700 A | 2/1997 | Krug et al. |
| 5,606,585 A | 2/1997 | Hu |
| 5,611,502 A | 3/1997 | Edlin et al. |
| 5,638,420 A | 6/1997 | Armistead |
| 5,642,394 A | 6/1997 | Rothschild |
| 5,692,028 A | 11/1997 | Geus et al. |
| 5,692,029 A | 11/1997 | Husseiny et al. |
| 5,696,806 A | 12/1997 | Grodzins et al. |
| 5,712,889 A | 1/1998 | Lanzara et al. |
| 5,729,582 A | 3/1998 | Ham et al. |
| 5,772,916 A | 6/1998 | Jamil et al. |
| 5,818,054 A | 10/1998 | Randers-Pehrson et al. |
| 5,828,719 A | 10/1998 | He et al. |
| 5,838,758 A | 11/1998 | Krug et al. |
| 5,838,759 A | 11/1998 | Armistead |
| 5,841,832 A | 11/1998 | Mazess et al. |
| 5,901,198 A | 5/1999 | Crawford et al. |
| 5,917,880 A | 6/1999 | Bjorkholm |
| 5,930,326 A | 7/1999 | Rothschild et al. |
| 5,966,422 A | 10/1999 | Dafni et al. |
| 5,970,113 A | 10/1999 | Crawford et al. |
| 5,974,111 A | 10/1999 | Krug et al. |
| 5,983,671 A | 11/1999 | Haines et al. |
| 6,009,146 A | 12/1999 | Adler et al. |
| 6,018,562 A | 1/2000 | Willson |
| 6,041,097 A | 3/2000 | Roos et al. |
| 6,078,642 A | 6/2000 | Simanovsky et al. |
| 6,088,423 A | 7/2000 | Krug et al. |
| 6,110,398 A | 8/2000 | Jamil et al. |
| 6,151,381 A | 11/2000 | Grodzins et al. |
| 6,218,943 B1 | 4/2001 | Ellenbogen |
| 6,236,709 B1 | 5/2001 | Perry et al. |
| 6,249,567 B1 | 6/2001 | Rothschild et al. |
| 6,256,404 B1 | 7/2001 | Gordon et al. |
| 6,259,762 B1 | 7/2001 | Pastyr et al. |
| 6,269,142 B1 | 7/2001 | Smith |
| 6,278,115 B1 | 8/2001 | Annis et al. |
| 6,292,533 B1 | 9/2001 | Swift et al. |
| 6,347,132 B1 | 2/2002 | Annis |
| 6,411,673 B1 | 6/2002 | Broomberg et al. |
| 6,411,674 B1 | 6/2002 | Oikawa |
| 6,416,960 B1 | 7/2002 | Bryan |
| 6,438,201 B1 | 8/2002 | Mazess et al. |
| 6,449,334 B1 | 9/2002 | Mazess et al. |
| 6,452,117 B2 | 9/2002 | Curcio et al. |
| 6,490,337 B1 | 12/2002 | Nagaoka et al. |
| 6,542,574 B2 | 4/2003 | Grodzins |
| 6,555,838 B1 | 4/2003 | Livingston et al. |
| 6,600,855 B2 | 7/2003 | Werkheiser et al. |
| 6,625,376 B2 | 9/2003 | Werkheiser et al. |
| 6,628,745 B1 | 9/2003 | Annis et al. |
| 6,668,033 B1 | 12/2003 | Schelten |
| 6,680,790 B2 | 1/2004 | Johnson et al. |
| 6,687,328 B2 | 2/2004 | Bavendiek et al. |
| 6,696,698 B2 | 2/2004 | Livingston |
| 6,713,777 B2 | 3/2004 | Karasawa |
| 6,735,271 B1 | 5/2004 | Rand et al. |
| 6,800,858 B1 | 10/2004 | Seppi |
| 6,800,870 B2 | 10/2004 | Sayag |
| 6,842,499 B2 | 1/2005 | Zapalac |
| 6,861,661 B1 | 3/2005 | Nakajim et al. |
| 6,865,333 B2 | 3/2005 | Porter et al. |
| 6,894,303 B2 | 5/2005 | Livingston |
| 6,963,678 B2 | 11/2005 | Werkheiser et al. |
| 6,965,661 B2 | 11/2005 | Kojima et al. |
| 6,998,632 B2 | 2/2006 | Magne et al. |
| 7,020,232 B2 | 3/2006 | Rand et al. |
| 7,050,536 B1 | 5/2006 | Fenkart et al. |
| 7,082,186 B2 | 7/2006 | Zhao et al. |
| 7,102,149 B2 | 9/2006 | Kuroda et al. |
| 7,103,137 B2 | 9/2006 | Seppi et al. |
| 7,112,807 B2 | 9/2006 | Yonekawa |
| 7,164,747 B2 | 1/2007 | Ellenbogen et al. |
| 7,170,079 B2 | 1/2007 | Fasbender et al. |
| 7,286,630 B2 | 10/2007 | Holt |
| 2003/0215055 A1 | 11/2003 | Ozawa et al. |
| 2004/0258196 A1 | 12/2004 | Lounsberry |
| 2005/0243321 A1* | 11/2005 | Cohen et al. .................. 356/432 |
| 2006/0126772 A1 | 6/2006 | Hu et al. |
| 2006/0237653 A1* | 10/2006 | Popescu ........................ 250/367 |
| 2006/0280286 A1 | 12/2006 | Kaval |
| 2007/0003003 A1 | 1/2007 | Seppi et al. |
| 2007/0140414 A1 | 6/2007 | Garms et al. |

| | | | |
|---|---|---|---|
| 2007/0147586 | A1 | 6/2007 | Scheinman et al. |
| 2007/0172020 | A1 | 7/2007 | Nambu |
| 2007/0183557 | A1 | 8/2007 | Manzke et al. |
| 2008/0173824 | A1 | 7/2008 | Sekiguchi et al. |
| 2008/0292050 | A1 | 11/2008 | Goodenough et al. |

FOREIGN PATENT DOCUMENTS

| | | |
|---|---|---|
| JP | 02-051045 | 2/1990 |
| JP | 03-002746 | 9/1991 |
| JP | 2001276052 | 9/2001 |
| JP | 2006-275853 | 12/2006 |
| SU | 741011 | 6/1980 |

OTHER PUBLICATIONS

International Search Report Application No. PCT/US08/01978, International Filing Date Feb. 13, 2008, Search Report Dated Dec. 5, 2008.

pp. 4366-4368 of an unidentified publication published prior to Feb. 13, 2007.

Radiation Protection in Radiotherapy, Part 5, External Beam Radiotherapy Lecture 2 (cont): Equipment and safe design, 49 page, downloaded Apr. 20, 2012.

* cited by examiner

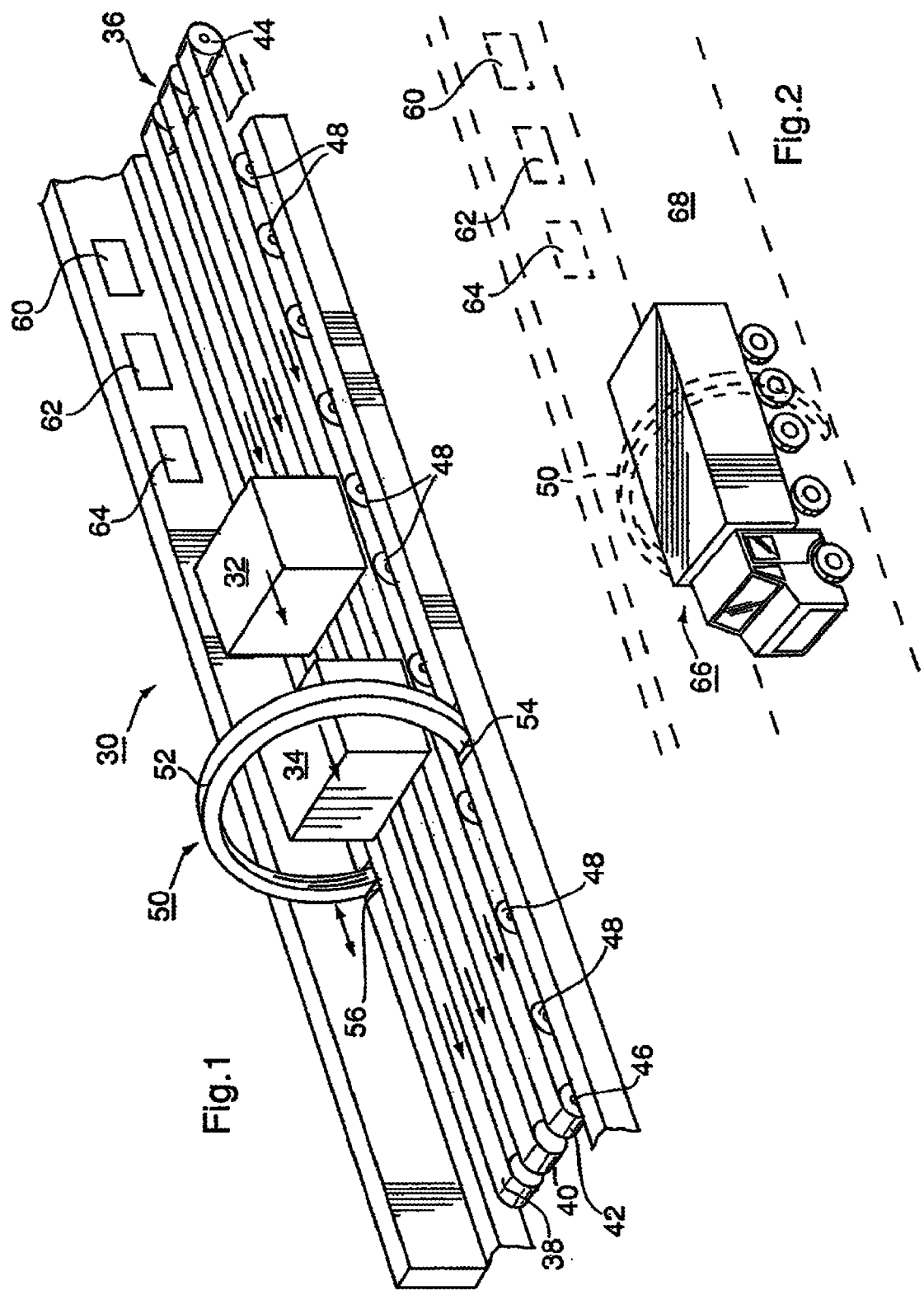

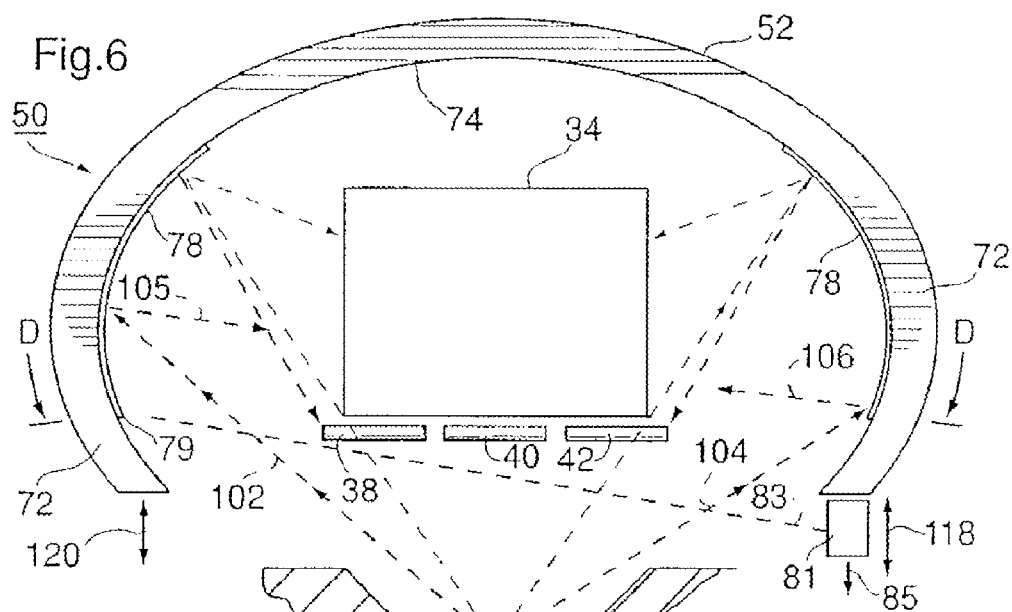
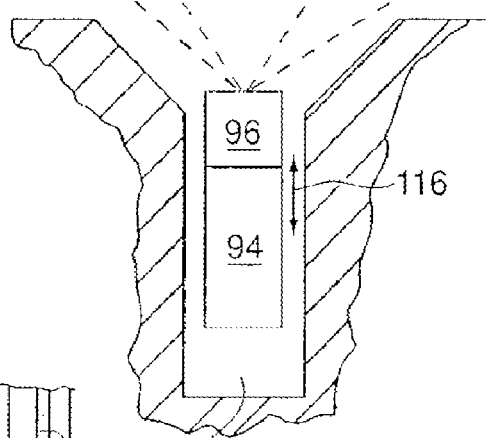
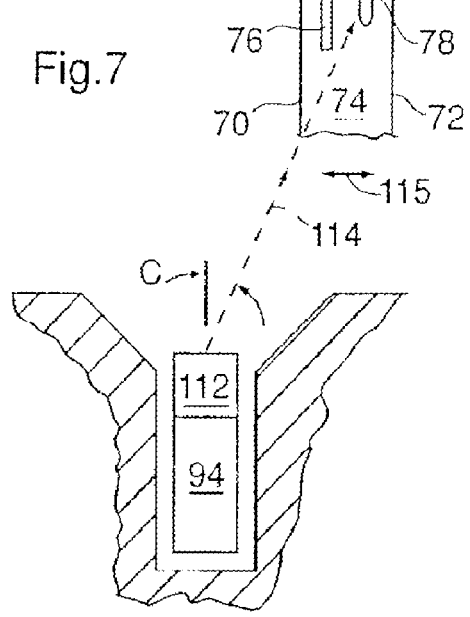
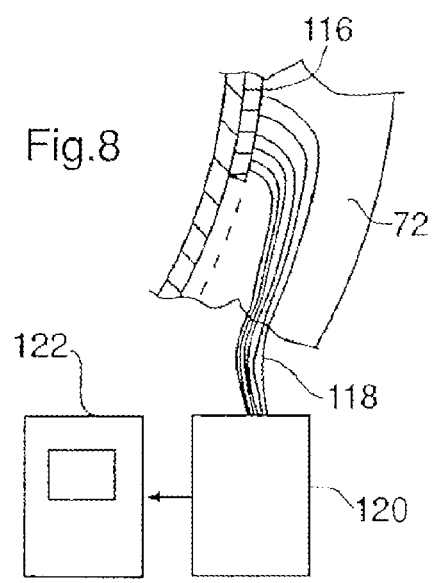

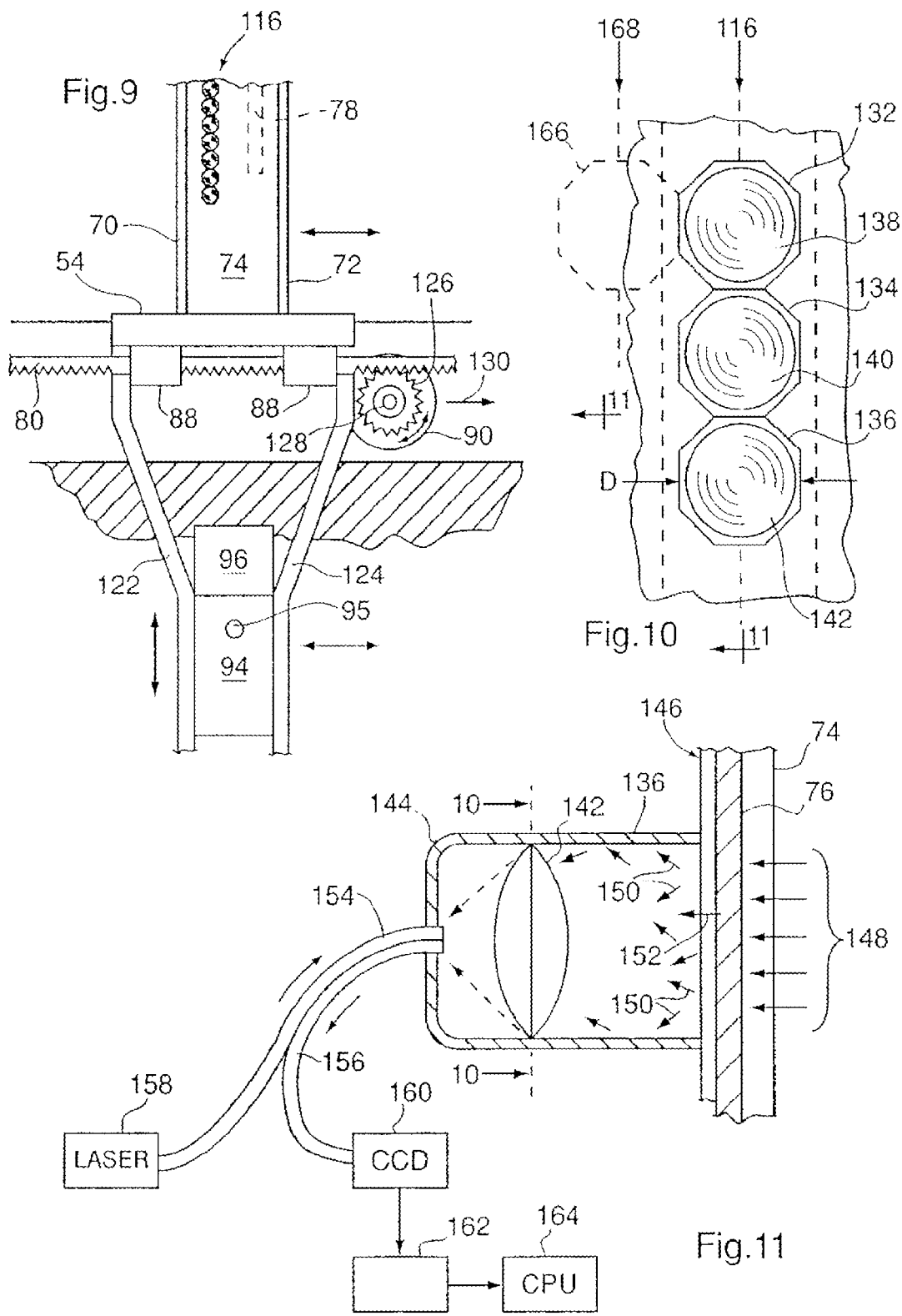

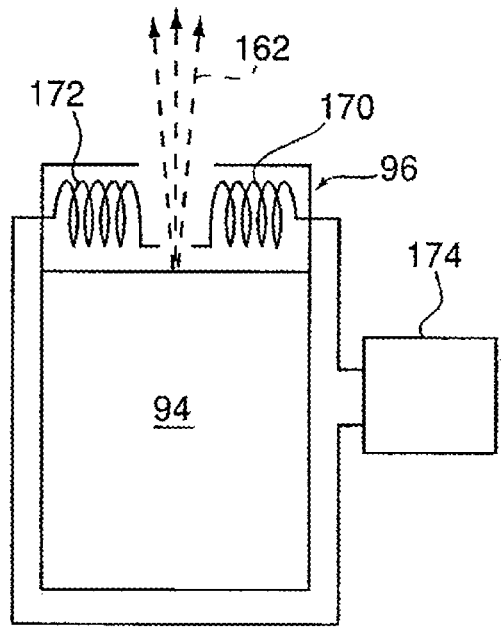
Fig.12
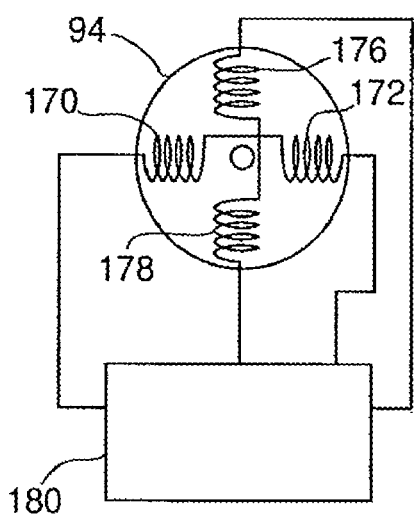
Fig.13
Fig.14
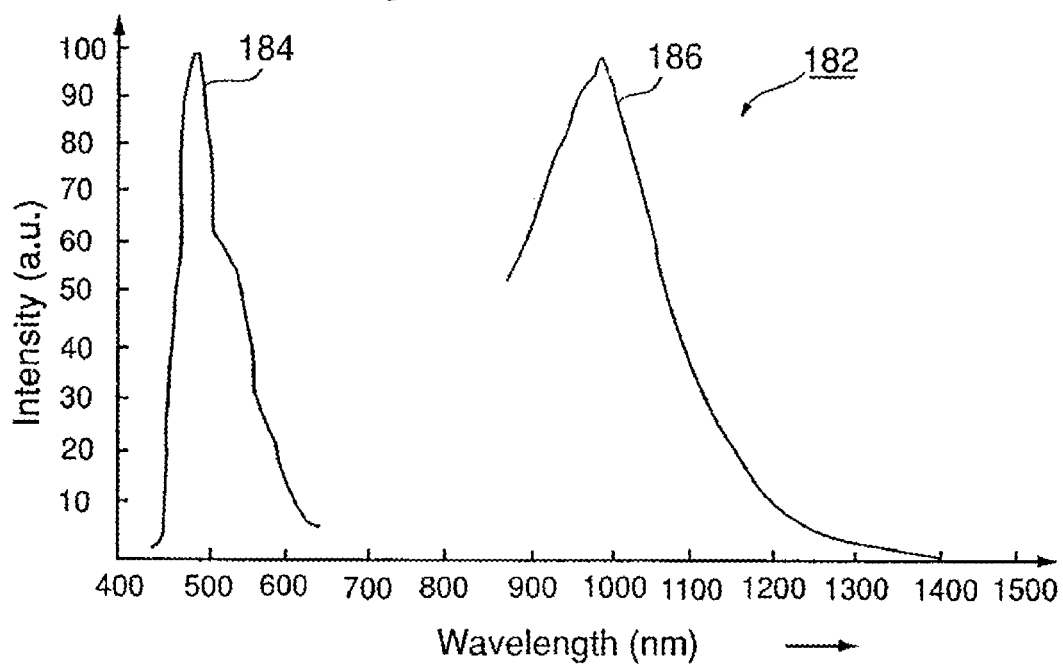

CT SCANNING AND CONTRABAND DETECTION

The subject application is a divisional of U.S. application Ser. No. 12/070,043, filed Feb. 13, 2008, which claims priority of U.S. Provisional Application No. 60/901,048, filed Feb. 13, 2007 and U.S. Provisional Application No. 60/901,065, filed Feb. 13, 2007, all of which are hereby incorporated by reference in their entirety.

The present invention relates to apparatus and methods for computed tomography ("CT") scanning.

More specifically, the present invention relates to CT X-ray scanners and methods for scanning relatively large objects or bodies; and to radiation detectors and detection methods for detecting X-ray and other radiation.

In particular, the invention relates to CT scanning and contraband detection in relatively large transportation containers such as standard sealed containers for transporting goods by ocean freight or air freight; land freight carrier containers such as truck bodies, railroad cars and the like; smaller cargo containers shipped on pallets or otherwise, and trunks and other baggage for ocean and airplane travelers, etc.

CT overcomes many problems faced by using conventional two-dimensional radiographs. CT does this by scanning thin slices of the body or other object with a narrow X-ray beam that rotates around the body or object. This produces an image of each slice as a cross section of the body, for example, and can thus show each of the tissues or objects in a slice of width ranging from 0.5 mm-10 mm, with 5 mm being typical.

In contrast to radiography, CT can also differentiate between tissues or objects of similar density because of the narrow x-ray beam and the use of "windowing." In CT, information acquired can be stored on a digital computer as digital raw data and an image can, for example, be displayed on a video monitor or printed onto x-ray film. Such an image is made up of a matrix of thousands of tiny squares or pixels. A conventional single slice CT image has 262,144 pixels arranged in an array of 512×512 pixels, and 1,048,576 pixels (known as a "Megapixel") arranged in an array of 1024×1024 pixels is fast becoming common.

The detection of contraband in transportation containers, and particularly in larger containers such as ocean freight cargo containers, air freight cargo containers, etc., presents a long-standing problem. Only a small percentage of such cargo containers are inspected for contraband, such as illegal drugs, explosive devices, illegal weapons, radioactive materials, etc. As a result, such containers present an inviting vehicle for the smuggling of contraband.

When such containers are inspected for contraband, it usually is very labor-intensive and time-consuming to do so. Therefore, it also is relatively expensive to do so. These factors are significant in limiting the amount of inspection which can be done at a tolerable cost.

Accordingly, one of the objects of the invention is to provide a system or device and method for inspecting transportation containers for contraband at a relatively modest cost.

CT scanners are used to perform the non-invasive inspection of objects such as luggage, bags, briefcases, cargo containers, vehicles and the like, to identify hidden contraband at airports, public buildings, roadways and other security checkpoints. The contraband may include hidden guns, knives, explosive devices and illegal drugs, for example.

Computed tomography ("CT") enables the reconstruction of the cross-sectional images of the cargo contents being scanned, enabling identification of the items in the container. CT images have long attracted much attention in the field of medical diagnosis because they provide a sharp tomographic image of a soft tissue which could not be obtained using conventional X-ray films. CT images also provide higher resolution, better image contrast and greater sensitivity to characteristics of the object being scanned, than radiographs.

While the smuggling of contraband such as guns and explosives onto planes in carry-on bags and in luggage has been a well known, ongoing concern, another serious threat is the smuggling of contraband across land borders by concealment in trucks or automobiles and by boat in large cargo containers. Standard cargo containers are typically 20 to 50 feet (6 to 14 meters) long, 8 feet (2½ meters) high and 6 to 9 feet (6 to 14 meters) wide. Air cargo containers, which typically contain many pieces of luggage or other cargo to be stored in the body of an airplane, may range in size from about 35 by 21 by 21 (around less than 1 meter by 0.7 by 0.7 meter) inches up to about 240 by 118 by 96 inches (6 by 3 by 2½ meters).

Large collections of objects, such as, for example, many pieces of luggage, may also be supported on pallets. Pallets, which may have supporting side walls, may be of a size comparable to cargo containers.

Typical airport scanning systems for carry-on bags have tunnel entrances up to about 0.40×0.40 meters. Scanning systems for checked luggage have only slightly larger openings. Thus, such systems are insufficient to inspect cargo containers because only bags that are small enough to fit through the scanner's tunnel may be inspected. The relatively low energies used in typical X-ray luggage and baggage scanners usually are insufficient to enable the X-rays to pass through the much larger cargo containers. In addition, many such conventional systems operate too slowly to economically inspect larger objects, such as cargo containers. Thus, the art faces problem in developing a system for scanning large objects efficiently and accurately.

Therefore, another object of the invention is to provide such a system or device and method which provides a relatively accurate and high quality inspection in a relatively short length of time.

A further object of the invention is to provide such a system or device and method which is relatively modest in manufacturing cost, and in costs to operate and maintain.

There have been numerous prior proposals for supplying equipment and methods to serve the same purpose as the present invention. However, it is believed that none of such prior proposals has been fully satisfactory, for a variety of reasons.

Some prior proposals involve the use of X-ray scanning and computer tomography to take many different images of the contents of a cargo container or the like and analyze the images to determine the composition of the materials at various locations within the container.

In one example, it has been proposed that a plurality of X-ray sources be moved on a semicircular track around a container to scan its contents, and that the X-rays passing through the container be detected. This proposal suffers from being very slow and expensive. The X-ray sources tend to be relatively heavy and difficult to move rapidly. Furthermore, because relatively high energy X-rays are required for inspecting large containers, the multiple X-ray sources can be very expensive.

Certain CT scanners have been proposed for producing scans of human patients by using a relatively large, arcuate sheet of phosphor material which records and stores X-radiation which it receives until stimulated by radiation such as laser beams to release visible light in proportion to the strength of the X-radiation received. However, such proposals have not met with wide acceptance for a variety of reasons.

It is one of the further objects of the invention to utilize the beneficial properties of such phosphor material in improved scanning and computed tomography as applied to transportation containers. For such a purpose, a suitable detector has heretofore not been available.

Accordingly, it is another object of the invention to provide such a detector and a method of analyzing the data received by the detector to produce CT scanning of transportation containers.

A further problem with X-ray scanning of transportation containers for contraband is that the radiation used can be harmful to humans or living animals which might be present in the container. In addition, CT scanning usually will not detect radioactive material. Also, CT scanning of empty portions of containers should be avoided to prevent wasted CT scanning time. Therefore, it is an object of the invention to provide a system and method in which these drawbacks, as well as the others mentioned above are resolved.

In accordance with the present invention, the CT scanner generates and directs X-rays from a variety of different points around the circumference of a body whose internal features are to be examined. The X-rays are generated by use of an electron beam source, such as a linear accelerator, cyclotron, or the like, and a control system which guides the electron beam towards a series of target areas located in a path extending around a portion of the body to form X-ray beams at each target area. Those beams are directed at the body, and an array of detector cells is provided in a area where the X-ray beams emerge from the body.

Preferably, each of the detector cells includes a lens or other optical system which focuses light received from a radiation detection surface. The light is focused upon a fiber-optic conductor. The fiber-optic conductors deliver light from the cells to an array of electrical signal responsive devices such as CCD's each of which forms and stores a pixel of an image of the area through which the X-rays passed.

It also is preferred that stimulating radiation be developed to a storage phosphor detector element to read out the light corresponding to the energy stored in the phosphor, and that the stimulating radiation be delivered from a source such as a laser through a fiber-optic conductor to the focal point of the focusing device.

The light then travels through the focusing device such as a lens and is distributed to the surface of the phosphor material. Therefore, both the output and the input light signals flow through the same path.

Also, in accordance with the present invention, the CT scanner is used in detecting contraband in transportation containers by scanning them with high energy X-rays, detecting and analyzing the radiation transmitted through the containers by use of an array of detector cells and computer means to determine whether particular area inside the container contains material identified as contraband. In effect, the system and method provides a CT analysis of the contents of the container.

The signals detected are compared by a computer with signals representing stored data. The data represents contraband substances such as illegal drugs, explosives, etc. When a match has been found, an alert signal is generated, and a computer image of the area in question is formed. This information is stored for every area of the cargo in which a match is found, and can be used later by inspection personnel to visually and personally inspect the cargo in the area identified by the contraband detection system and method When one of the areas is detected as containing a material identified as contraband, authorities are notified. Preferably, then, and only then, an image of the area in which the contraband has been located is formed on a screen for use by human inspectors to investigate the potential contraband in person. The location information can be stored and used at a later time after the container has been removed from the CT scanning station so as not to delay the flow of containers through that station.

In one embodiment, discussed briefly above, the detector uses phosphor material which, in effect, stores signals corresponding to the X-radiation it receives. The detector system then delivers stimulating radiation to the phosphor material, which causes the material to emit light in an amount which is a function of the X-radiation it has received. Alternatively, scintillation crystals can be used to detect the X-radiation and emit corresponding amounts of light. The light then is transmitted by fiber optical conductors to the computer analysis equipment.

Preferably, the direction of the electron beam produced by the linear accelerator is controlled by modulating a variable magnetic field through which the beam passes as it emerges from the source. The electromagnetic field can be controlled so as to guide the electron beam successively towards each of a plurality of target areas extending around a part of the periphery of the body to be inspected, such as a cargo container. In effect, this scans the desired container volume without the use of a moving X-ray source, and allows the system to operate at a much higher speed than if the heavy X-ray source had to be moved in order to scan the X-ray beam across the cargo container.

Preferably, the electron beam target areas and detectors are mounted on a frame, which can be in the shape of an arch or other structure extending over and around the sides of the cargo container. The arch can be moved along a track in one direction while the cargo container is stationary. Alternatively, the arch and electron beam source remain stationary and the cargo container is moved through the arch. In either case, the container is scanned by moving the targets and detectors and the container relative to one another.

A separate conveyor or railcar system is provided for the cargo containers themselves to move them up to the scanning position and out of the scanning station when scanning has been completed, or to move them through the stationary arch.

The arch is moved by a pair of gear motors driving the arch structure along guide rails, or by another suitable drive and guidance system. Preferably, the instantaneous position of each end of the arch is sensed accurately by a position detector and the position signals are delivered to a computerized control system to control the position of the arch very accurately.

Similar means can be used to accurately and smoothly move the container through a stationary arch.

A computerized guidance system can be used to keep the electron beam aimed at the target areas, and to ensure that the X-rays are correctly directed to the detectors.

It is within the scope of the invention also to provide an electron beam source which is stationary and whose beam is scanned both along an arc, and also in a longitudinal direction along the director of travel of the arch, to adjust for movement of the arch in scanning the container. Such longitudinal motion can be avoided by securing the electron beam source and the arch together.

Then, the electron beam source can be mounted to travel with the arch or remain stationary while the container moves past.

Although the electron beam can be directed to its targets through the ambient air without a vacuum chamber, a vacuum chamber can be used, or dual electron beam sources can be used, each with a vacuum chamber, to protect the beam from the elements and reduce attenuation.

The inspection station can include preliminary detectors to detect other kinds of problematic cargo in the containers. For example, at a first station, heat detectors can be used to determine whether live human beings or animals are present within the containers. If so, appropriate measures are taken to remove humans, and to remove the animals, if necessary to avoid potential damage by the high energy X-rays delivered at the inspection station.

At another preliminary inspection station, linear X-ray scans can be performed to determine where the empty spaces in the cargo container are so as to avoid CT scanning of areas of the containers which do not need such scanning.

Other preliminary inspection scans can be performed as needed. For example, at a third station, the detection of radioactive materials can be performed by the use of appropriate detection equipment.

The result of the invention is the provision of a CT scanning system and method, and a contraband detection system and method which solves or greatly alleviates many of the problems described above. Therefore, the invention admirably meets the objectives set forth above.

The CT scanning system can be modified and downsized to be used for extremely rapid CT scanning of smaller objects such as baggage and packages, and humans, by adding shielding and other protective structures to prevent deleterious contact between the subjects being analyzed and the electron beams, and reducing the energy levels of the X-rays produced.

The radiation detector, and particularly the one using a stimulatable storage phosphor, is highly advantageous for use with radiation detection in areas outside of CT scanning, and has general utility for that purpose.

The foregoing and other objects and advantages of the invention will be apparent from or explained in the following description and drawings.

IN THE DRAWINGS

FIG. 1 is a schematic perspective view of one embodiment of a contraband inspection station constructed in accordance with the present invention;

FIG. 2 is a similar schematic perspective view of an inspection station like that shown in FIG. 1 but for trucks instead of separate cargo containers;

FIG. 6 is a schematic front elevation view of the equipment and system shown in FIG. 3;

FIG. 7 is a schematic side elevation view, partially broken away, which illustrates one embodiment of the invention;

FIG. 8 is a schematic, partially broken away view illustrating some of the features of the detector system used in the invention;

FIG. 9 is a schematic side elevation view illustrating a portion of another embodiment of the invention;

FIG. 10 is an enlarged front cross-sectional view taken along line 10-10 of FIG. 11 and showing multiple detector cells like the one shown in FIG. 11;

FIG. 11 is a cross-sectional view of a detector cell structure of FIG. 10 taken along line 11-11 of FIG. 10 and showing connections to input and output equipment;

FIG. 12 is a schematic diagram of one embodiment of the controllable electron beam source equipment of the invention;

FIG. 13 is a schematic view of another embodiment of the controllable electron beam source of the invention;

FIG. 14 is a graph showing the variation of radiation intensity of the stimulating radiation and the emitted light output from the X-radiation recording medium when stimulated by the stimulating radiation;

GENERAL DESCRIPTION

Figure 3:
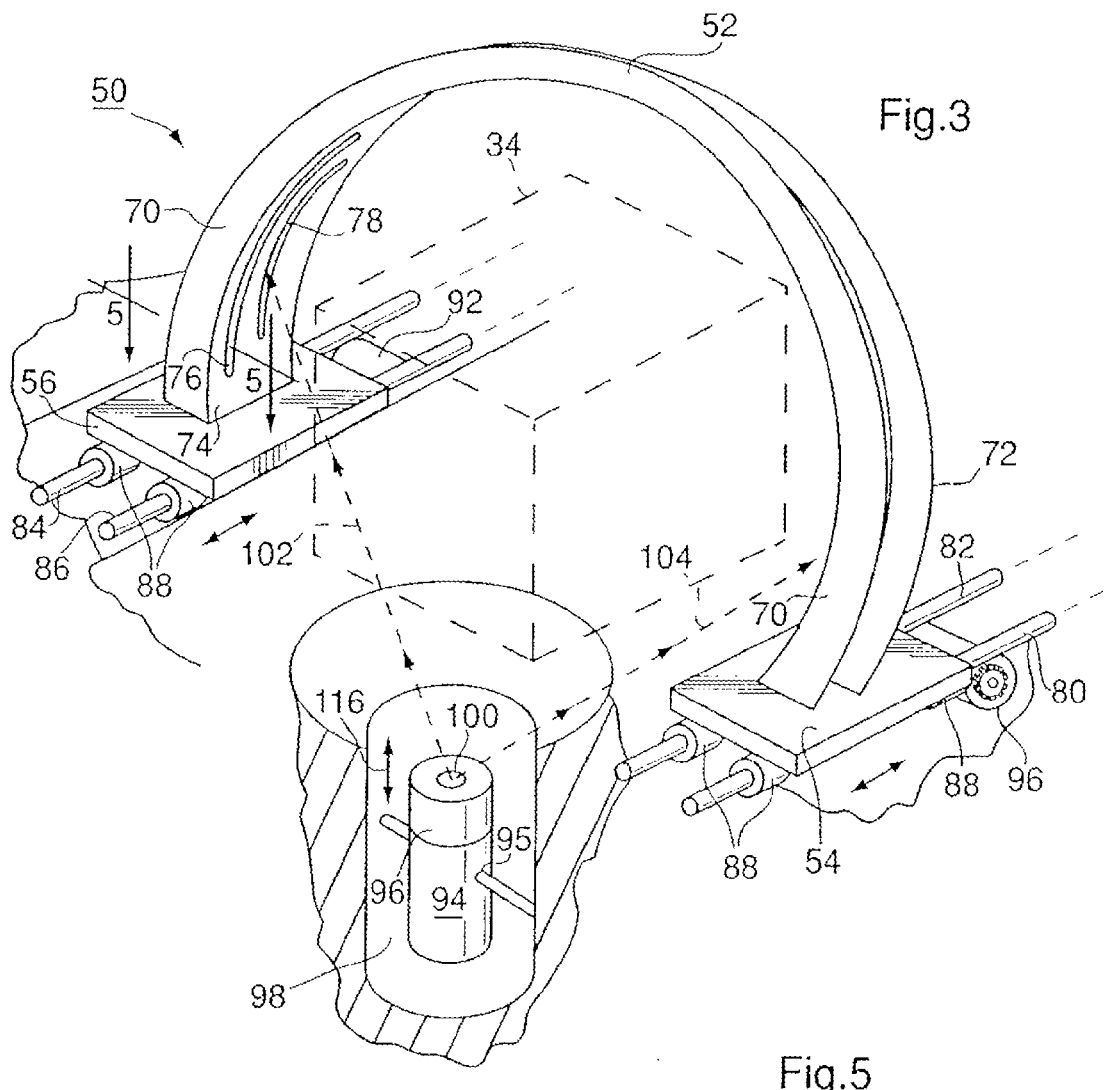
FIG. 3 is a schematic perspective view of the CT scanning equipment of the system shown in FIGS. 1 and 2.

FIG. 1 is a schematic perspective view of an inspection terminal 30 in which the invention is used. The terminal is specifically designed for use in inspecting cargo containers such as the containers 32 and 34 which are used in great numbers in shipping goods by ocean freight. However, the containers 32 and 34 can be considered to be representative of all large containers which are not supported on their own wheels. Examples include air line cargo and baggage containers, "piggy-back" containers carried by trucks, and other containers or supports such as pallets containing cargo to be inspected.

The terminal 30 includes a conveyor system 36 with multiple conveyor belts 38, 40 and 42, drive rolls 44 and 46 and drive/idler rolls 48 along its length. The conveyor system is adapted to support and carry the containers 32, 34 from the right towards the left and through the inspection station 30.

A CT scanning station 50 is provided for the detailed scanning of the contents of each cargo container. Also provided are three preliminary scanning stations which are optional but recommended.

At the first preliminary scanning station 60, a thermal camera is provided to detect humans and animals which may be located in the containers. Such humans and animals can be stow-aways, farm animals, illegally captured wild animals, such as monkeys, parrots, etc. It is desired to detect such human and animal life in the containers to remove them and protect them from the high energy X-rays to which the container will be subjected at the CT scanning station 50.

At a second preliminary station 62, conventional X-rays can be used to perform a first scan of the cargo container to determine where the cargo might reside in the container, if it is not full, so as to avoid unnecessary scanning of empty space in the CT scanner, and also to detect potential problem areas for the CT scanner. The results of this preliminary scanning operation can be delivered to a human operator of the CT scanner to enable the operator to limit the area of the container scanned by the CT scanner, or a signal can be sent to the CT scanner to automatically limit the scan zone without human intervention.

At a third preliminary station 64, radiation detectors are provided for detecting radioactive materials in the containers so as to enable their removal, either immediately or later, after the CT scan.

The CT scanner 50 includes an arch 52 with a base support structure 54 or 56 at each of the lower ends of the arch. The arch 52 preferably moves forwardly and backwardly during CT scanning of a stationary container 32 or 34.

When the CT scan is finished, the container 34 moves to the left by means of the conveyor system and is removed to another location by means of a fork lift truck or other lifting and carrying mechanism.

If necessary, the container can be moved to one side out of the way of the other containers so it can be inspected by human inspectors, should the CT scan indicate the necessity for same. Thus, any container suspected of harboring contraband can be inspected without interrupting the flow and inspection of other containers.

FIG. 2 is a schematic perspective view of a modified version of the terminal 30. The terminal has been modified to accept and inspect trucks or other wheeled vehicles such as railroad cars, etc., which need no conveyor belt system to carry them through the inspection process. A simple roadway 68 is provided on which the truck can roll past the stations 60, 62 and 64 and up to the CT scan station 50 where the truck is inspected in the same manner as the cargo containers 32 and 34.

If railroad cars are being inspected, tracks can be provided, as disclosed below, leading through the various stations so that the rail cars can simply roll into and out of the terminal on the tracks.

The height and length of the various transportation containers can differ significantly from one another. Accordingly, the CT scanner equipment preferably is made adjustable to accommodate a variety of different sizes of containers, as it will be made apparent in the disclosure to follow.

It should be understood that the structures shown in FIGS. 1 and 2, and in other figures of the drawings, are schematic and omit a number of features which would be present in a finished inspection station. Those features include a building with a roof over it to enclose and protect the station; shielding to protect workers and equipment from excessive X-ray exposure; and support beams for the arch 52, the conveyor systems, etc. These omissions are for the purpose of simplifying the description of the principles of construction and operation of the invention.

CT Scanner

The CT scanner 50 is shown schematically in some detail in FIGS. 3 to 14.

Figure 4:
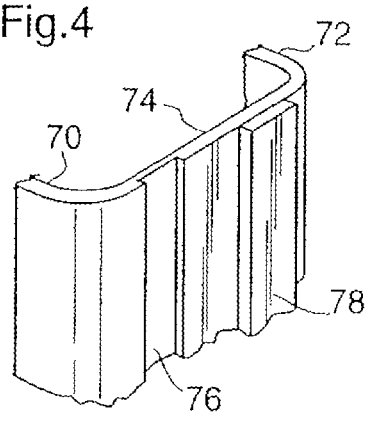
FIG. 4 is a perspective cross-sectional broken away view of a portion of the structure shown in FIG. 3.
Figure 5:
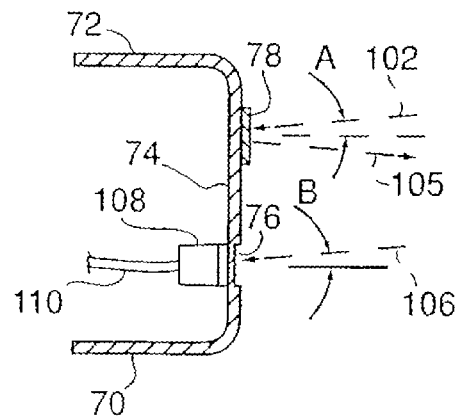
FIG. 5 is a cross-sectional view taken along line 5-5 of FIG. 3.

Referring first to FIGS. 3 through 6, the arch 52 is illustrated as an aluminum beam with a C-shaped cross section as shown in FIG. 5. The beam is formed into an oblate semi-circular shape, as shown in FIGS. 1, 3 and 6. The beam has a central web section 74 and side flanges 70 and 72.

As it is shown in FIGS. 4 and 5, the web section 74 has a narrow vertical recess 76 extending upwardly from each end of the arch. The recess forms an area in which the aluminum material of the beam is relatively thin to pass X-rays transmitted through the cargo container to a row of detectors 108, 116, as shown in FIGS. 5 and 8, with minimal attenuation.

Attached to the web 74 to one side of and parallel to the recess 76 is a strip 78 of metal such as lead or copper which serves as a target strip. As with the recess 76, there is a target strip 78 on each side of the arch 52, as it is shown in FIG. 6.

The arch 52 is mounted to be movable along two pairs of guide rails 80, 82, and 84, 86. The support plates 54 and 56 are mounted to slide on the guide rails by means of ball-bearing sleeves 88 so that the arch 52 will move smoothly along the guide rails and will be supported against tipping backwardly or forwardly.

The arch can be moved forwardly and backwardly, by two separate reversible gear motors 90 and 92, one at each side of the arch By this means, the motors 90 and 92 can move the arch, the target strips 78 and the detector arrays back and forth past the container 34 to provide a CT scan of the contents.

Still referring to FIGS. 3 and 6, mounted in a hole 98 in the ground beneath the container 34 being scanned, is a high-energy electron beam source 94 such as a linear accelerator with a magnetic field control section 96 for deflecting the electron beam issuing from an opening 100 at the top of the source. The means for mounting the unit 94 in the hole 98 is not shown. However, preferably it allows for vertical adjustment, in the direction of the arrow 116, of the position of the electron beam source to accommodate the scanning of cargo containers of different sizes and shapes.

It should be noted that preferably the arch 52 is mounted so as to be movable vertically in the directions indicated by the arrows 118 and 120 in FIG. 6, also for the purposes of accommodating CT scanning of containers of different sizes.

The electromagnetic field control section 96 provides a variable strength electromagnetic field through which the electron beam issuing from the linear accelerator 94 passes. The electromagnetic field can be modulated so as to deflect the beam in a controllable manner towards successive areas of the target strips 78.

Preferably, the linear accelerator issues an electron beam with relatively high energy, e.g. 8 mev to 18 mev, preferably around 9 mev. For example, the Linac Model 3000C linear accelerator sold by Varian Medical Systems can be used.

The target strips 78 are of moderate width and thickness, e.g., 5 cm wide and 1 to 2 cm thick. By making them continuous, rather than separate and discrete targets, different target areas can be selected to properly scan containers of different sizes and shapes.

Referring now to FIG. 6, electron beams such as those shown at 102 and 104 are directed to a target strip 78. When the electron beam strikes the target material, X-rays are produced by means of the bremstrallung effect. Preferably, the X-rays issued from the strips are in fan-shaped form. Thus, the X-rays are directed in a fan-shaped pattern extending over a substantial arc.

The X-rays pass through the container 34 because they are of high enough intensity to pass through the metal or other materials of which the container is made, as well as the objects within the container. Some of the transmitted X-rays enter the vertical recesses 76 behind each of which is arranged a linear array 116 of detectors (FIG. 8) at each side of the arch 52. The X-rays pass through the relatively thin aluminum material in the recesses 76 and enter the detectors.

As it is shown in FIG. 8, fiber-optic conductors 119 conduct electrical light signals, generated in the manner described below, detected by the detectors, to an analyzer unit 120 which analyzes the detector signals and forms signals representing the pixels of a display which could be used to show the objects being scanned within the container 34. The analyzer device 120 compares the signals with known signals representing contraband such as cocaine, explosives, etc. When a match between the scanned substance or object and the data base values is found, this is indicated by means of an indicator such as a light and/or an audible alarm, and a 3-D picture is formed on the screen of a computer 122 to provide a picture of the area in which the contraband was found. This picture then can be used by an investigator to enter the container and determine whether the material actually is contraband and then take appropriate action.

Preferably, the pictures can be saved in computer storage and recalled later when the container has been pulled out of the inspection station and can be manually searched without delaying transit of other containers through the station.

Referring to FIG. 5, it can be seen that the electron beam 102 is directed at the target at a certain angle A such that the x-ray 105 emitted from the target area 78 will be correctly directed to the opposite detector array. X-ray signal 106 is shown arriving at the recess area for detectors at an angle B at which it is emitted by the opposing target area 78.

It should be understood that the required angles A and B can be created by tilting the strip 78 as needed, or by positioning the arch 52 relative to the electron beam source appropriately.

It should be understood that several alternative structures and devices can be used instead of those described above.

Other relatively high-energy electron beam sources can be used instead of a linear accelerator. For example, a small cyclotron with magnetic field control; electrostatic accelerators; a betatron and other known accelerators can be used as the electron beam source.

Guide rail and drive structures other than those described above also can be used. For example, instead of the cylindrical guide rails 80, 82, 84, 86, two railroad rails can be used, together with appropriate modifications to the rolling support and drive structure, as it will be described below. Such rails usually are able to support larger loads, without excessive flexing, over longer distances than the cylindrical rails.

A conveyor belt support and drive system is another alternative. However, the conveyor should be carefully constructed to give minimal vibration, in view of the fact that X-rays will be projected as the conveyor moves continuously.

X-Ray Detector

The preferred x-ray detector of the present invention is shown in greater detail in FIGS. 10 and 11.

First referring to FIG. 10, the detector consists of a linear array of detector cells, each formed by a housing 132, 134, 136, etc. made of metal and having an octagonal exterior and a cylindrical interior, with a converging very short focal length lens 138, 140 or 142 mounted in the housing as shown in FIG. 11. Each cell has a cap like the cap 144 secured to its housing, as it is shown in FIG. 11. FIG. 10 shows each cell without its cap. Mounted into the outermost end of the cap 144 are the ends of two fiber optic conductors 154 and 156. Alternatively, a single fiber-optic conductor adapted to conduct signals from two sources can be used.

Secured to the inside surface of the thin aluminum web opposite the recess 76 is a sheet or a coating 146 of material containing an electron-trapping storage phosphor material such as one having a strontium sulfide base with one or more dopants such as either cesium or europium. This material has the property that, in reaction to the receipt of X-rays, it stores a signal in an amount proportional to the intensity of the X-rays it receives. Subsequently, when the material 146 is stimulated with radiation at an appropriate wavelength, the material 146 emits energy at a different wavelength, preferably in the form of visible light.

The lens 142 collects the visible light emitted by the material 146. The lens has a very short focal length which enables it to focus the light it receives on the ends of the optical fiber 156 to deliver a light signal to a CCD camera unit 160 and an analyzer unit 162 and a CPU 164 for analyzing the signal, together with others conducted in a similar fashion from the other detector cells that have been struck by an X-ray beam.

Preferably, in order to couple a maximum amount of light to the optical fiber, the divergence angle of the focused spot should be equal to the acceptance angle of the fiber. This means that the focus of the lens is given by the numerical aperture (NA) of the fiber.

The stimulating radiation is delivered by a laser source 158 through the fiber optic conductor 154, at a predetermined small time interval after the X-ray beam has been received.

Advantageously, the stimulating radiation signal is delivered to the focal point of the lens, and the stimulating signal passes through the lens 142 which spreads the beam and distributes the radiation over the surface of the phosphor material.

FIG. 14 is a graph showing the wavelengths of the stimulating radiation 186 and the light radiation 184 emitted by the phosphor material 146. As it can be seen, the stimulating radiation has a peak between 900 and 1000 nm (nano meters), and the emitted light is centered near 500 nm, which means that the light is basically green in color.

Preferably, the stimulating radiation is developed by a conventional, readily-available Nd:Yag laser whose output is centered at 1064 nm. Of course, it should be understood that other laser sources could be used instead. However, the wavelength of the excitation radiation should be well separated from the wavelength of the emitted radiation, and should be suited to the particular phosphors used in the sheet 146.

Precautions should be taken to be sure that only the desired radiation is processed. Thus, a filter should be used to eliminate the IR radiation provided by the Nd:YAG laser to stimulate the electron-trapping material (in some cases, the CCD cameras provides an IR filter). Alternatively, the optical fiber may have its maximum spectral response around the green light emitted from the electron trapping material, so the IR radiation is attenuated. Finally, the CCD cameras should operate well in the visible region and can be adjusted for integration times.

A preferred phosphor has the following active ingredients: Strontium sulfide (95.780%); lithium fluoride (4.205%); cerium sulfide (0.013%), and samarium oxide (0.003%). The remainder consists of inert ingredients. This phosphor reacts to both X-ray radiation and visible light. However, because each detector has an opaque metal housing, visible light is excluded and cannot reach the phosphor. There are other phosphors having characteristics like those described above and available for use in practicing the invention. These are well known and need not be listed here.

For the purpose of use in the cargo scanner 50, each cell preferably has an outside dimension of one centimeter. The octagonal exterior shape for the cell housing facilitates aligning and mounting the cells in arrays with numerous rows and columns of cells, if desired.

Smaller cells would be advantageous where greater resolution is needed, such as in medical or baggage scanners.

In a typical installation, there will be two arrays of detector cells, one on each side of the arch 52. Each array covers an angle of 90 degrees plus 15 degrees or 105 degrees total. The total angle D (FIG. 6) defining coverage by the two arrays is thus 180 degrees plus 30 degrees or 210 degrees. In a typical arch, each of the detector arrays might be 4.2 meters in length, for example, and contain 420 cells. Thus, two arrays of 420 cells each is considered to be adequate to form a single row detector.

It is also possible to have multiple columns of cells side by side, as shown in dashed outline at 166 in FIG. 10. The second array would be aligned along the vertical line 168 parallel to the linear array 116. Additional vertical rows of cells can be added as deemed necessary. However it is believed that a single row will be adequate in most circumstances.

Instead of, using the phosphor member 146 as a detector element, it would be possible to use known scintillation crystals to detect the x-rays and emit visible light signals in response. Such crystals do not need simulating radiation to operate. However, the phosphor sheet or coating 146 has the advantage that it stores the signals and will permit delayed retrieval of the light signals, if necessary, and can be much less costly than the crystals. Furthermore, the stimulation signals can be, and are used to enable the detectors at precise instants of time while not having to turn the X-ray generator off and on frequently.

Securing the sheet or coating 146 to the thin aluminum web portion 76 has advantages over mounting it by other means. In FIG. 11, the incoming X-rays are indicated at 148. When the phosphor is stimulated, light is emitted as indicated by the arrows 150, to be collected by the lens 142 and projected on the fiber optic output line 156. However, the phosphor emits light in substantially all directions around it. Therefore, a substantial portion of the light is directed towards the right instead of towards the left and thus normally would be lost. However, in accordance with the present invention, the aluminum surface of the web at 76 reflects some of the otherwise wasted light, as indicated by the arrow 152, so that it intensifies the light signal detected. If desired, the aluminum can be given a coating of a green color to enhance the reflections.

Figure 21:
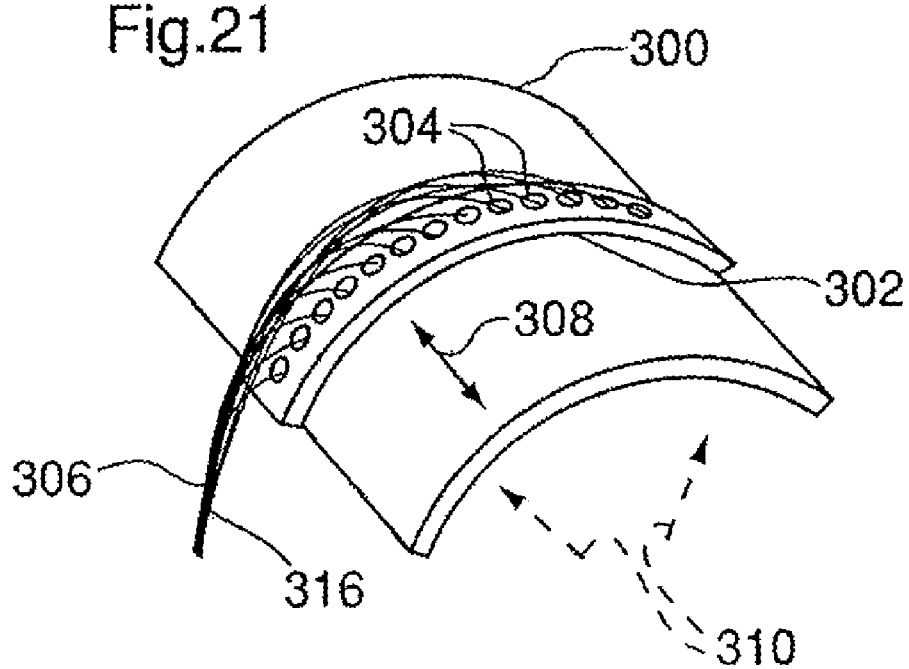
FIGS. 21 and 22 are schematic perspective views of two storage phosphor X-ray detector sheets with movable arrays of detector cells for scanning the sheets to read-out the X-ray images stores in them.
Figure 22:
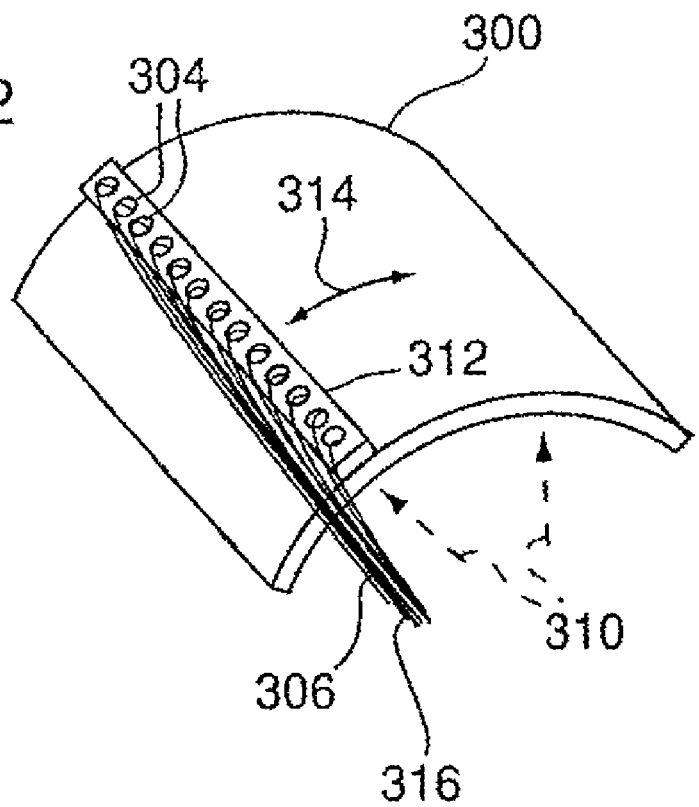

FIGS. 21 and 22 show a semi-cylindrical sheet-form detector surface having a coating of storage phosphor on the upper surface of a semi-cylindrical member made of aluminum, or opaque plastic or the like. A scanner consisting of a curved support member 302 or a straight support member 312 carrying a linear array of detector cells 304 is moved across the phosphor-coated upper surface of the member 300.

Stimulation signals are delivered over one of the optical fibers 306 or 316 to read out the stored signals, and the light signals read out are delivered over the other set of optical fibers to a CCD array or other utilization means.

If the phosphor used is sensitive to visible light as well as X-rays, the top surface should have an opaque cover over it (also covering the scanning mechanism to prevent false readings due to stray visible light).

Alternatively, the phosphbor can be one of the many known phosphors which is sensitive to X-rays but not to visible light.

The detectors shown in FIGS. 21 and 22 can be placed at the sides of the arch in place of the linear arrays, if a large-surface area detector is needed, and in other uses for large surface area detectors.

Electron Beam Deflection System

FIGS. 12 and 13 schematically demonstrate two different electron beam deflection systems provided in accordance with the present invention.

FIG. 12 shows a magnetic field-generating pair of coils 170 and 172 energized and modulated by a variable electric supply 174 which varies the strength of the field. The electromagnetic coils provide a magnetic field which is transverse to the direction of the electron beam 102. Soft iron armatures (not shown) also may be provided in order to concentrate and strengthen the magnetic field. Armatures made of other highly permeable magnetic material can be used instead of soft iron. However, it is advantageous, in some instances, to avoid using any armatures. This allows faster changes in magnetic field strength.

The transverse electromagnetic field bends the electron beam and deflects it to control the direction.

The device shown in FIG. 12 can be used to sweep the beam back and forth from the left to the right and back again inside the arch 52 to create a plurality of X-ray beams in sequence when the beam hits different areas of the target strip 78 to the left of the cargo container 34, and then hits the target strip 78 to the right of the cargo container 34 to complete one sweep, and then completes another sweep by returning to its starting position.

Preferably, the intensity of the beam can be controlled to keep the beam intensity constant, or adjust it to compensate for unwanted deviations.

Preferably, the detectors are computer controlled in accordance with a program that enables the detectors to sample the X-rays transmitted through the cargo container once during each small time interval during each sweep of the electron beam so as to provide, in effect, a rotating X-ray beam source which sweeps the entire cargo container in well under one second. The program adjusts the signals stored in the CCD devices in accordance with variations in the strength of the X-rays due to varying distances of the target areas from the electron beam source, etc., in order to correct for such variations.

Figure 15:
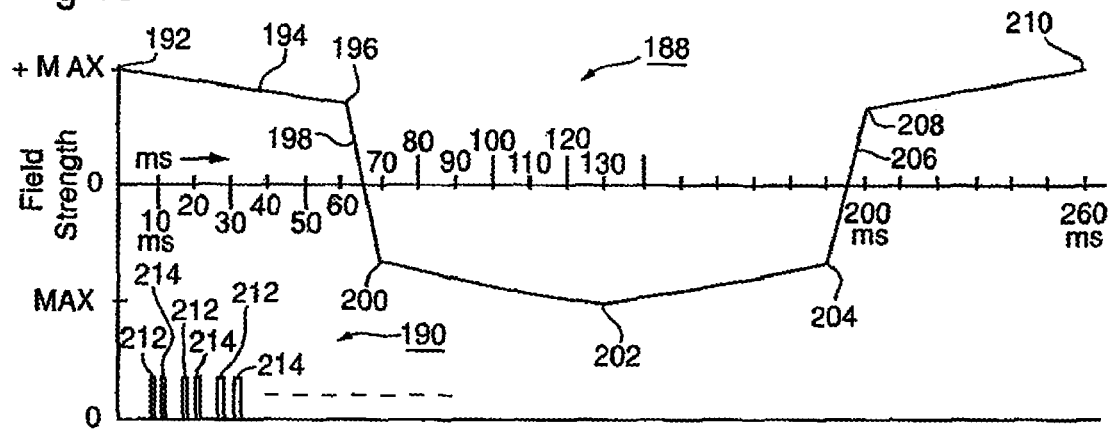
FIG. 15 is a graph illustrating another feature of the invention.

FIG. 15 is a graph 188 showing, in principle, the variation of the strength of the magnetic field used to direct the electron beam. The various segments of the graph are shown as straight lines in order to explain the principle of operation, whereas in practice they may be curved in order to take into account system anomalies requiring non-linear variation of the field strength.

The horizontal scale is in milliseconds, and the field varies in strength and polarity from positive to negative and back again to positive.

At the start of a first sweep, at time zero, the field strength at point 192 is at its maximum value, and the electron beam is at its position farthest to the left in FIG. 6.

The field strength decreases in curved segment 194 until the beam sweeps to a point represented at 196 where it is about to strike the cargo container.

Since there is no need to move the electron beam slowly over the cargo, in segment 198 the field strength decreases as rapidly as possible and reverses polarity to point 200 at which the beam has been swept to a position where it just misses the right-hand lower corner of the cargo container 34, and then drops at a much slower rate until it reaches the maximum negative value at 202. At this point, the electron beam reverses its path, swinging from right to left, until, at 204, the beam again encounters the right-hand lower corner of the cargo container and increases as rapidly as possible over the segment 206 to the point 208 where it reaches the left-hand lower corner of the cargo container. Thereafter, the field strength increases at a slower rate until the beam reaches the starting position at 210. At this point, the cycle is repeated with the beam sweeping again from left to right. This is repeated as many times as necessary to scan the entire volume of the cargo container.

As it can be seen, the horizontal axis for the graph 188 is divided into segments, each of which is ten milliseconds in width. It is at each of these ten millisecond time intervals that it is desired to sample the X-rays transmitted through the cargo container.

FIG. 15 also shows at 190 a portion of signals 212, 214 which are delivered from the laser source to the detector cells. One short pulse 212 is delivered just prior to reaching the ten millisecond time mark, and the second pulse 214 is delivered shortly after that time. The effect of this is to disable each detector cell from reading out any X-ray transmission data until the first pulse 212 erases any radiation energy stored in the phosphor material. Then, the phosphor material is quickly exposed to the X-ray radiation, and then the pulse 214 is sent from the laser to read the data stored in the phosphor at that time. Thus, only when the pulses 214 are delivered are signals sent to the CCD array to be stored and processed. This has the effect of filtering out anomalies produced in the X-ray signals during transition of the electron beam between successive target locations, and precisely locates each target location on a time basis.

Preferably, the signals 212 and 214 are delayed before operating at point 200 if the transition between point 196 and point 200 requires more than ten milliseconds.

As stated above, the CCD array is programmed to normalize the X-ray signal strength to compensate for varying distances between the beam source and the target areas being scanned.

It should be understood that the time interval and the scan sweep speed can be determined to meet criteria other than those given by way of example here. For example, the time interval of ten milliseconds between sequential samples can be reduced or increased, as needed and desired.

As it is shown in FIG. 15, there are at least six time intervals during each of the sweep segments from 192 to 196, 200 to 202, 202 to 204, 208 to 210, etc. However, this number can be increased or reduced as necessary and desired.

With the timing illustrated in FIG. 15, the system produces approximately eight complete sweeps of the electron beam from one side of the arch to the other during each second of operation. Since the width of the cell array is approximately one centimeter, this means that the arch and the cargo container should move relative to one another about one centimeter for every complete sweep, which is about eight centimeters per second. At this rate of speed, it should be possible to scan an entire area of the cargo container within one or two minutes or faster.

Ideally, the cross-section of the electron beam is circular. Preferably, the diameter of the circle is substantially less than the width of the target strip so that the beam produces a maximum intensity of X-radiation at all times.

One problem with such an electron beam is that the electron concentration in the center of the cross-section often is relatively much lower than in the outer portions. In order to make the electron beam density more uniform, it is known practice to vibrate the beam slightly so as to scan it over a very short distance sufficient to spread the electron density more evenly over the cross-section. It is preferred that this vibration be provided for the electron beam used in the present invention.

As it has been noted above, it also is possible for a beam to be deflected out of its intended path slightly or varied in intensity due to changing ambient conditions. This can be corrected by varying the signal delivered to the field producing coils, especially those in the FIG. 13 arrangement, so as to apply signals to correct the path of the electron beam, and also to vary its intensity. The orthogonal coils can move the beam in two different directions, as it will be explained below.

One preferred mechanism is shown in FIG. 6 for use in compensating for such changes. FIG. 6 shows a calibrating unit 81 positioned just below the lower right edge of the arch where it is positioned to receive part of the rays of the first X-ray beam produced when the electron beam is at its left starting point. That X-ray beam strikes the calibrating device 81 once during every other sweep.

The calibrating device is a conventional and well known device used in hospitals, usually once a day, to calibrate X-ray equipment used in the hospital. The calibration unit sends a signal 85 to the control system for the magnetic fields controlling the electron beam and the linear accelerator producing the electron beam to compensate for deviations from the desired standard set earlier in the day. The difference is, however, that the calibration routine can be performed easily and automatically more than once a day. In fact, the routine can be performed for every different cargo container being scanned, and even once at the end of every scan back-and-forth across the arch so as to provide for prompt correction of errors as they may occur.

Another calibration device like device 81 can be positioned adjacent the bottom edge of the left-hand side of the arch 52 as shown in FIG. 6, if needed. By this means, rapidly occurring changes in ambient air pressure, temperature or humidity, or other short-term anomalies in the electron beam can be compensated for as frequently and as promptly as needed.

A second electron beam deflector device is illustrated schematically in FIG. 13. In FIG. 13, in addition to the coils 170, 172 forming a first magnetic field through which the electron beam travels, there is an orthogonal field created by two additional coils 176 and 178. Both fields are controlled by a suitable control unit 180 to provide motion of the electron beam not only in the side-to-side sweep motion described above, but also in a direction longitudinal to the cargo container 34; that is, referring to FIG. 7, the beam is deflected through an angle C while the beam source 94 remains stationary so that the beam 114 remains focused on one of the target strips 78. This deflection is used to maintain contact between the electron beam and the target strip 78 during movement of the arch 52 in the direction indicated by the arrow 115 in FIG. 7.

It should be understood that the two sets of coils shown in FIG. 13 can be vertically spaced from one another, if necessary, in order to provide an appropriate amount of space for proper operation.

Even where the electron beam source travels with the arch, as shown in FIG. 9, or where the arch and the electron beam source are fixed and the cargo moves through the arch, the orthogonal coils can be used to adjust the position of or vibrate the electron beam, as described above.

By sweeping the electron beam across the targets instead of moving multiple X-ray sources, a large amount of weight is removed from the portions of the scanner which must be moved. This increases the potential speed of operation of the scanner very considerably.

An alternative arrangement for moving the electron beam source as the arch moves is shown in FIG. 9. The electron beam source 94, 96 is mounted on support brackets 122 and 124 secured to the mounting plates 54 and 56 (only one of which is shown in FIG. 9) so as to be mounted rigidly with respect to the arch. Then, as the arch moves, the electron beam source moves also so that only small correction movements are required by the orthogonal coils 176, 178 shown in FIG. 13. The position of the electron beam source and/or the arch can be adjusted vertically, as in the FIGS. 3 through 6 embodiment.

Still another means for moving the electron beam to accommodate longitudinal movement of the arch 52 is to mount the electron beam source 94, 96 on an axis 95 (FIGS. 3 and 9) passing through the center of the source and being perpendicular to the paper on which FIG. 9 appears. This would require movement by only a small distance for each beam sweep, and the motion can be continuous, like the movement of the arch, so as to minimize vibration and maximize the speed of operation.

Scanning Motion and Control

In scanning a desired volume of the shipping container 34 the following method is used.

First, it should be noted that each of the gear motors 90 and 92 has a drive gear 126 (see FIG. 9) which meshes with accurately cut teeth along the underside of the each of the guide rails. The drive motors are reversible and are attached to the mounting plates 54 and 56. Therefore, the operation of the drive motors will propel the mounting plates and the attached structure along the guide rails. in both the forward and rearward directions.

Preferably, a shaft position encoder wheel 128 is attached to the output shaft of each motor. The output signals from the encoders are delivered over a line 130 to appropriate servo control equipment so as to provide a very accurate indication of the location of each of the drive motors, and correspondingly accurate control of the speed of movement. Thus, the operation of the two drive motors can be synchronized and controlled very accurately to accurately position the arch 52 and control its speed.

In starting a scan, the drive motors are started and preferably run continuously until the end of a fairly lengthy section of the container has been scanned. This is greatly preferred to stopping and starting the arch structure once for every scan. This eliminates the adverse effects of most of the stopping and starting inertia, reduces vibration, and promotes smooth, rapid scanning operation. If the electron beam source 94, 96 is to be rotated about its axis 95, that also can be done by a suitable drive motor with accurate position indication.

As the arch is moving continuously, the electron beam produced by the source 94 is continuously swept back and forth from one side of the arch to the other, while remaining aimed accurately at the target strip 78. If necessary, electronic tracking devices in common used for tracking moving objects can be used to ensure that the electron beam remains in contact with the moving strips 78 during each sweep.

If a single row of detector cells is used, there is one sweep of the beam from one side of the arch to the other for every centimeter of length moved by the scanning mechanism. The results of these sweeps produce signals representing pixels of images of objects in the cargo container.

After the arch has moved by a predetermined distance, say two or three meters, it is stopped. Then, if it has completed the scanning of a given container, it stops and waits for the next container to be moved into position for scanning. If it has not finished the scan of the first container, but has reached the limit of its motion (such as might be dictated by the maximum angle C permissible as shown in FIG. 7, for example) the cargo container is then moved forward until the scanned area moves past the scanner. Then, the scanner moves in the opposite direction to complete the scan of the container. When the scanner reaches its limit in the other direction, it stops and reverses again, this time scanning either a new container that has been moved into position, or a further section of the container still being scanned.

In this embodiment of the invention, it is preferred that the cargo container be completely stationary while it is being scanned.

Alternative Embodiment

Figure 16:
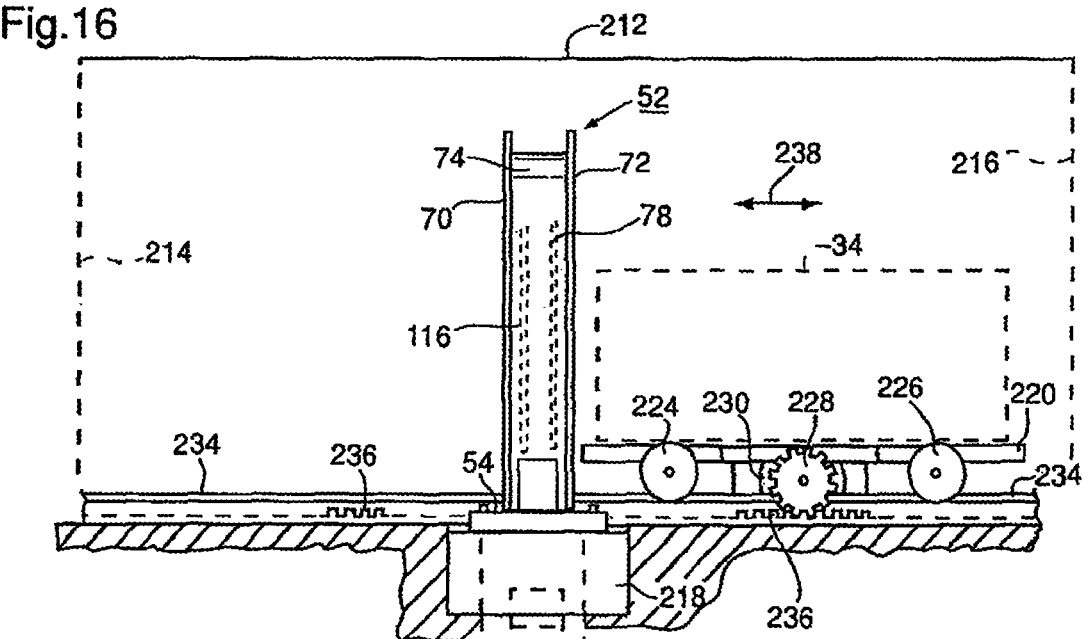
FIG. 16 is a front elevation view, partially schematic, illustrating another embodiment of the invention.
Figure 17:
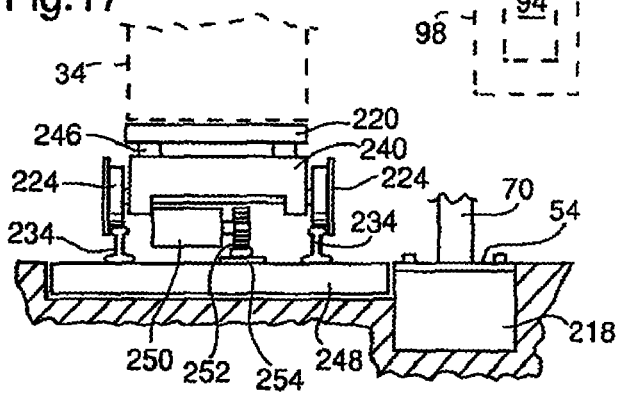
FIG. 17 is a side elevation view of a portion of the FIG. 16 structure.

An alternative embodiment of the invention is shown schematically in FIGS. 16 and 17. In this embodiment, the arch 52 and the electron beam source remain stationary while the cargo container 34 is moved through the arch. This arrangement sometimes is preferred over the one described above in which the arch or the combination of the arch and the electron beam source move relative to a stationary cargo container.

In order to facilitate this embodiment, means are provided for moving the cargo container 34 in the direction of the arrow 238 shown in FIG. 16 very smoothly, at a carefully controlled speed. For this purpose, a flatbed rail car 220 with standard railroad wheels 224 and 226 is provided to move along standard railroad rails 234 secured to cross-ties 248 (FIG. 17) buried in the ground or otherwise mounted on the ground, as in any standard railroad roadbed. The rails 234 carry the rail car smoothly through the arch 52 from right to left in FIG. 16. The arch and the inspection equipment are shown contained in the building indicated schematically at 212 with entrance doors 216 and exit doors 214.

The flatbed rail car can be driven by any of a number of well known drive mechanisms. One such mechanism which is believed to be suitable is that shown in FIG. 16 including an electric drive motor 230, driving a cog wheel 228, meshed with a cog rail 236 mounted on the ground. As with the embodiment of the invention shown in FIG. 9, preferably, a code wheel is attached to the cog wheel 228 to send accurate position signals to a control system to accurately control the speed at which the cargo container 34 is moved along the rails through the arch.

The cog wheel 228 and the cog rail 236 are shown to one side of the flatbed rail car 220, for simplicity of illustration.

FIG. 17 shows a different drive motor location underneath the carriage 240 in which the axles for the wheels 224 are mounted. A drive motor 250 rotates a cog wheel 252 which mates with a cog rail 254. The drive motor and the cog wheel are located under the rail car out of the way.

The arch 52 is mounted on a plate 54 which is bolted to a concrete mounting block 218 buried beneath the surface of the earth, as is illustrated in FIGS. 16 and 17. The electron beam source 94 is mounted in a hole 98 and thus is fixed in place beneath the arch 52 where it will remain in alignment with the arch. The array 116 of detectors and the target strip 78 are the same as those shown in FIGS. 1 through 6, etc.

Another feature is illustrated in FIG. 17 which can be used to convert the flatbed rail car 220 to lift and support trucks to carry them with their loads through the arch 52 for inspection. A jack system 246 is provided to lift the flat top of the top 220 of the rail car upwardly under the truck frame. By carrying the truck on the smooth tracks at a precisely controlled steady speed, the accuracy of detection of the contents of the truck can be improved.

It also should be evident that the railroad tracks 234 can be used to carry standard railroad cars through the arch for inspection as well.

The strength of the flatbed rail car 220 should be sufficient to hold the maximum load expected. Cargo containers typically weigh anywhere from 1 ton to 40 tons.

It also should be understood that the tracks 234 extend well outside of the building 212 in which the inspection equipment is housed. Thus, the flatbed rail car, after passing through the arch and outwardly through the doors 214 on the track 234 can have its cargo container 34 lifted by means of a crane, which then can load the container onto a nearby ship, or otherwise position it for further processing.

If potential contraband has been detected, the crane can move the container 34 to a different location to await actual inspection by inspectors who are guided to look for specific objects in specific areas within the containers. A special siding with tracks branching off from the tracks 234 can be provided for storing containers to be inspected, with the tracks 234 continuing to a station where the containers can be loaded onto a ship. Multiple flatbed cars can be provided for carrying the cargo containers. Also, preliminary inspection stations can be provided as shown and described in connection with FIG. 1 of the drawings.

The building 212 housing the inspection station equipment preferably has climate control equipment for controlling the temperature, air pressure, and humidity inside the building.

If the flatbed cars are used to carry motor trucks through the inspection station, the trucks either can be lifted onto the raised flatbed of the rail car by means of a crane, or they can be driven up a ramp and onto the flatbed and rest on the tires of the truck. This is described as an alternative to the system shown in FIG. 17 which uses jacks 246 to lift the truck up by its undercarriage.

In another embodiment of the invention, it may be possible to integrate the inspection equipment with a ship loading crane which has equipment for picking up the cargo container and lifting it onto the ship. In this embodiment, it is preferred to move the arch past the stationary cargo container because there is little room to move the container past a stationary arch. Therefore, the invention can make good use of either type of motion.

Vacuum Chamber Embodiment

Although, in the embodiments described above, a single electron beam source sends an electron beam through open air to a target and scans the beam along the target to produce X-rays, it may be preferable to house the target and the electron beam in a vacuum chamber so as to protect the target and the electron beam from the elements and minimize corrections needed. In addition, it may be preferred to use an electron beam scanning system in which neither the arch nor the electron beam source need be raised or lowered to accommodate cargo containers of different sizes.

Figure 18:
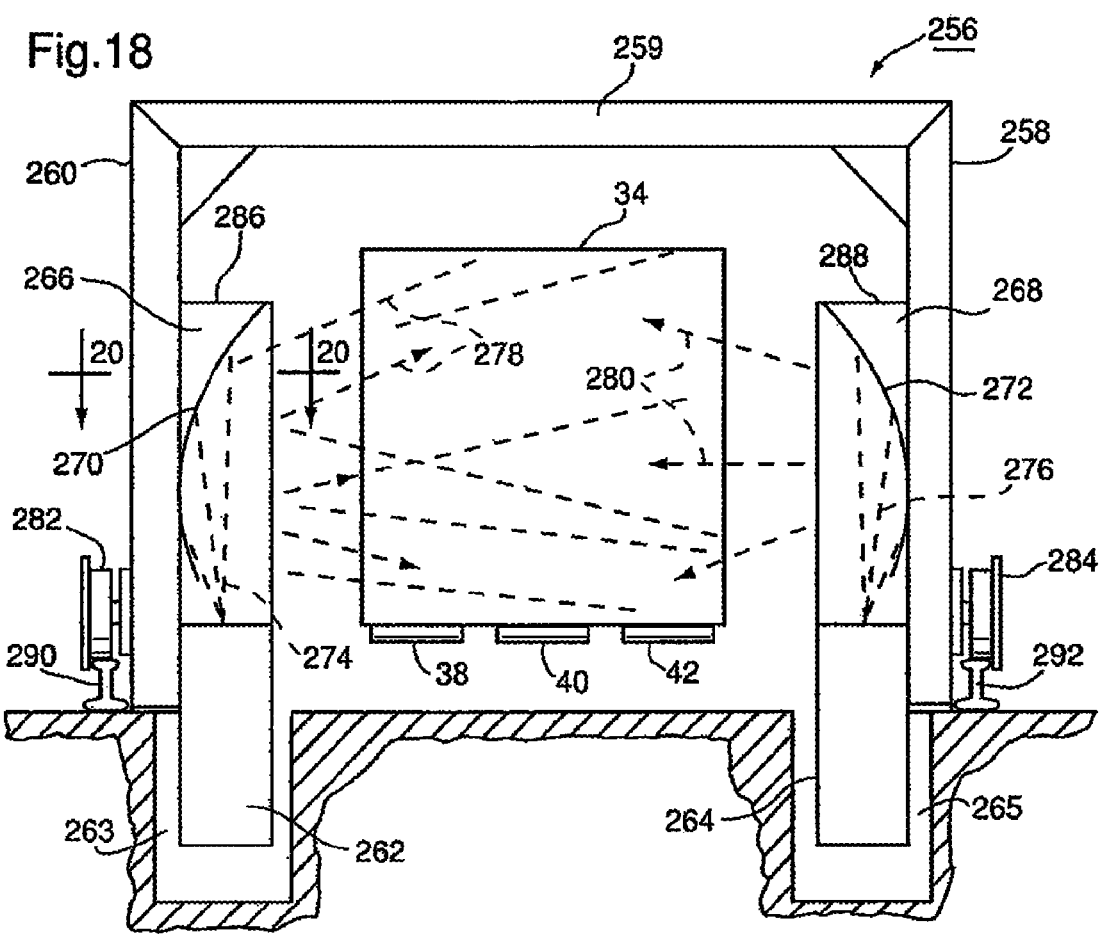
FIG. 18 is a side elevation schematic view of another embodiment of the invention.
Figure 19:
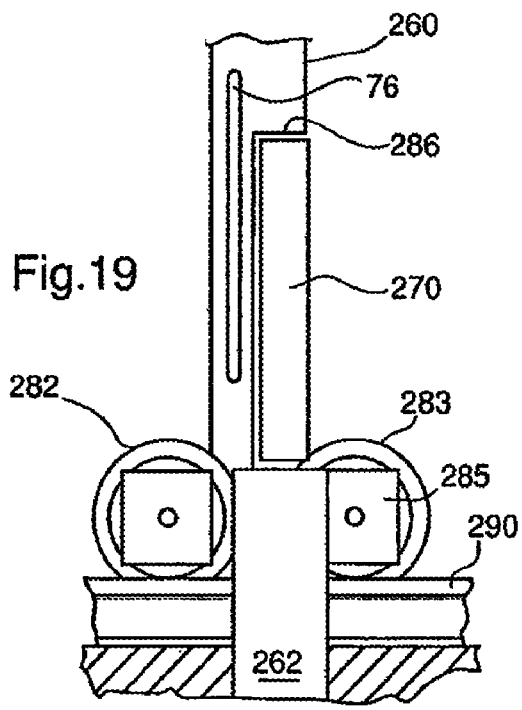
FIG. 19 is a front elevation, partially broken-away view of the embodiment of FIG. 18.
Figure 20:
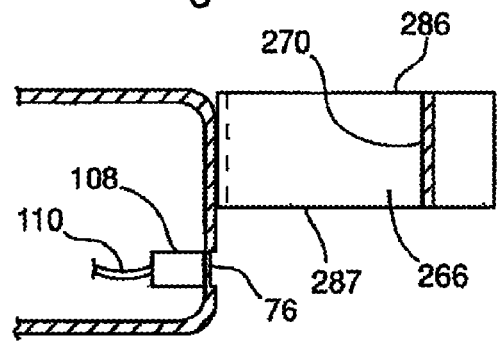
FIG. 20 is a cross-sectional view taken along line 20-209 of FIG. 19.

FIGS. 18, 19 and 20 describe an alternative embodiment of the invention in which both of the latter objectives are achieved.

Referring first to FIG. 18, an arch 256 is provided. It is functionally the same as the arch 52 shown in previous Figures of the drawings, except that it is of rectangular construction instead of curved construction and thus may be easier to fabricate. The arch 256 consists of a vertical beam 258, a top horizontal, beam 259, and a second vertical beam 260. Each of the vertical beams is mounted on a carriage 285 to which railroad wheels 282 and 283 are mounted to ride on railroad rails 290, 292.

It should be understood that the arch 256 also could be mounted in a stationary position with a rail system for moving the cargo container 34 through the arch instead, if preferred.

In accordance with one feature of this embodiment, two electron beam sources 262 and 264 are provided, each with a controllable magnetic field structure for scanning an electron beam 274 or 276 along a curved target strip 270 or 272 mounted in a vacuum chamber 266 or 268 formed by an air-tight housing 286 or 288. Each of the electron beam sources and vacuum chambers is secured to one of the upright beams 258 or 260. The lower end of each electron beam source moves in a trench 263 or 265, at least partly below ground.

The two electron beam sources operate in sequence to produce X-ray beams impinging first against the target strip 270 and then against the target strip 272 to form X-rays which scan the cargo container 34 in the manner described above.

Two separate electron beam sources are used instead of one for several reasons.

One reason is that a vacuum chamber for the single electron beam source shown in FIGS. 3 through 6, etc., might have to be extremely large and expensive and difficult to maintain. The total volume of the two separate vacuum chambers can be much less, thus reducing the cost of the vacuum chambers.

A second reason for providing two electron beam sources is that, by so doing, there is no need for the electron beam to clear the body of the cargo container on its way to one of the target strips, as is the case in FIGS. 3 through 6. As a result, there should be no need to raise or lower the arch 256 or the electron beam sources in order to accommodate different sizes of cargo containers.

Third, it may be possible to reduce the required energy output from each of the electron beam sources by the use of vacuum chambers, and by the constructions used, so that lower power output and hence less expensive electron beam sources can be used.

The use of the vacuum chambers can reduce the attenuation or disturbance of the electron beam by air puffs, etc., on its way to the target.

It should be understood that other structures and electron beam device arrangements can be used to advantage if a vacuum chamber is acceptable and otherwise desirable.

It should be noted that the front panel 287 (see FIG. 20) of each vacuum chamber has been removed for the purposes of illustrating the target structure of the targets 270 and 272 shown in FIG. 18.

The construction shown in FIGS. 18 through 20 for the vacuum chambers is particularly advantageous because the curved target strip 272 is secured to opposite side walls 286 and 287 of the vacuum chamber to provide stiffening and support for the broad sides of the vacuum chamber to hold the chambers in a rectangular shape.

As it can be seen in FIGS. 19 and 20, the detector area 76 and detector array behind it are as shown in FIGS. 3 through 6, except that the detectors are arrayed in a vertical linear array. If needed or desired, a curved surface can be provided to support the detector structure as shown in FIGS. 3 through 6.

Energy Control and Environmental Considerations

It should be readily understood by those skilled in the art that the electron beam traveling through air from the linear accelerator to the targets 78 will suffer a substantial amount of attenuation. It can be assured that, even under the worst circumstances, there will be sufficient power to deliver usable X-rays. This is done by the simple expedient of ensuring that the electron beam is of sufficiently high energy. It is believed that the 8 to 18 mev energy levels identified above will be sufficient to give this assurance.

Some variation in the level of energy delivered to the target area from the electron beam may result from changes in the pressure, temperature or humidity of the air in which the CT scanner is operated. These factors can be controlled, to a large extent, by housing the terminal in an air-conditioned, climate-controlled enclosure, and by the use of automatic, frequent re-calibration of the device by the means described above.

To the extent that such control is not completely possible, or in case of variations in power delivered to the targets for other reasons, the power levels, measured in terms of x-ray radiation produced, can be sensed by one or more of the detectors in a given test scan, and control of the energy delivered by the electron beam accelerator can be corrected to compensate for such changes, if necessary.

Alternatively, the computer program analyzing the data detected by scanning the container can be modified to correct for the variations in power level. These correction features can be implemented easily by those skilled in the art.

CT Data Analysis and CT Reconstruction

The CT analysis software used in the invention is readily available to the public and can be freely downloaded from the worldwide web. The only modifications needed are to adapt the software to the system disclosed. Data bases needed for comparison purposes to identify contraband typically are developed for each new item of contraband as it is detected. Some such data bases already are available and can be used in the invention. These uses and developments can be made readily, without undue experimentation, by those skilled in the art.

Programming the Operational Features

Programming the computerized beam scanning and control; arch or cargo container movement, automatic calibration and correction features described above also are well within the skill of trained programmers and will not be described in detail herein.

Recapitulation

As a result of the invention, CT scanning of transportation containers can be done within a reasonable length of time, and even relatively quickly so as to greatly increase the attractiveness of using the technique to detect contraband. Furthermore, the equipment used is relatively simple and less expensive than equipment previously proposed to be used for the same purpose. Therefore, the invention facilitates a trend towards 100% inspection of cargos before they are loaded on ships, or when they are received, or when they are in transit from one place to another to reduce the use of transportation containers as convenient, relatively safe conveyors of contraband.

The above description of the invention is intended to be illustrative and not limiting. Variations, changes or modifications to the embodiments described may occur to those skilled in the art. These can be made without departing from the spirit or scope of the invention.

What is claimed is:

1. A radiation detector comprising an array of detector cells, each of said cells comprising:
   a housing a stimulatable radiation detector member mounted at said housing;
   a focusing device mounted at said housing for focusing light received in said housing from said detector member;
   an optical fiber light conducting structure mounted at said housing to receive light focused by said focusing device;
   an energy conversion device connected to receive a light signal delivered over said optical fiber conductor structure for converting said light signal into a corresponding electrical signal; and
   a stimulation source for selectively supplying to each of said detector members stimulating radiation,
   wherein each of said fiber optic conductors has one end terminating at the focal point of said focusing device in one of said cells, said fiber optic conductors being selected from the group consisting of two separate fiber optic conductors and a single fiber optic conductor adapted to conduct both stimulating radiation and said output light signals alternatingly.

2. A detector as in claim 1 including a stimulation source for selectively supplying to each of said detector members stimulating radiation.

3. A detector as in claim 2 in which said stimulation source comprises a source of stimulating energy arranged to deliver said stimulating energy to a plurality of fiber-optic conductors, each connected to one of said cells to deliver stimulating radiation thereto.

4. A detector as in claim 1 in which said energy conversion device comprises an array of semiconductor devices, one connected to each of said light conductors.

5. A detector as in claim 1 in which said light stimulatable detector member comprises a photoluminescent storage phosphor stimulatable by electromagnetic radiation of a wavelength substantially different from that of said light signal.

6. A detector as in claim 5 in which said phosphor is an alkaline earth metal sulfide doped with rare earth impurities.

7. A detector as in claim 6 in which said alkaline earth metal sulfide is selected from the group consisting of strontium sulfide and calcium sulfide, and in which said rare earth impurities comprise samarium and an element selected from the group consisting of an europium compound and a cerium compound.

8. A radiation detector comprising an array of detector cells, each of said cells comprising, a housing, a stimulatable radiation detector member mounted at said housing, a focusing device mounted at said housing for focusing light received in said housing from said detector member, an optical fiber light conductor mounted at said housing with one end at the focal point of said focusing device for delivering stimulation signals to said detection member from a stimulation source.

9. A detector as in claim 8 including an energy conversion device connected to receive a light signal delivered from said radiation detector member over an optical fiber light conductor receiving light at one end located at the focal point of said focusing device of each of said cells.

10. A detector as in claim 8 including an energy conversion device connected to receive a light signal delivered over an optical fiber light conductor receiving light at one end located at the focal point of said focusing device of each of said cells, and in which said light stimulatable detector member comprises a photoluminescent storage phosphor stimulatable by electromagnetic radiation of a wavelength substantially different from that of said light signal.

11. A radiation detector comprising at least one detector cell comprising a support structure, a light focusing device mounted on said support structure, a fiber optic conductor structure secured to said support structure and including at least one fiber-optic conductor with an end located at the focal point of said focusing device, and a source of stimulating radiation connected for delivering a stimulating radiation signal over said fiber-optic conductor structure to said focal point.

12. A detector as in claim 11 comprising an array consisting of a plurality of said cells, and said fiber optic conductor structure includes at least one fiber-optic conductor connected between said focal point of said focusing device of each of said cells and said stimulating radiation source for delivering stimulating radiation from said source to each of said cells.

13. A detector as in claim 11 in which said support structure comprises a housing, said focusing device comprising a convex lens mounted in said housing, said focal point being located at one end of said housing, said housing having an end opposite said one end for receiving light from a radiation sensor element for converting said radiation into light.

14. A detector as in claim 13 including a stimulatable storage phosphor detector member at said opposite end of said housing, said phosphor member being receptive to said stimulating radiation signal to deliver a light signal to said lens.

* * * * *